Feb. 24, 1959 D. J. LA BELLE 2,874,956

LEAF AND AIR SPRING SUSPENSION

Filed Dec. 20, 1954 2 Sheets-Sheet 1

INVENTOR
Donald J. LaBelle
BY C. F. Oibbe
ATTORNEY

INVENTOR
Donald J. LaBelle
BY C. H. Sibbe
ATTORNEY

United States Patent Office 2,874,956

Patented Feb. 24, 1959

1

2,874,956

LEAF AND AIR SPRING SUSPENSION

Donald J. La Belle, Pontiac, Mich., assignor to General Motors Corporation, Detroit, Mich., a corporation of Delaware Application December 20, 1954, Serial No. 476,247

1 Claim. (Cl. 267—18)

This invention relates to a vehicle suspension including an elastic member capable only of taking vertical load, e. g., an air bellows or equivalent instrumentality as a coil spring or rubber column, and more particularly concerns such a suspension adapted for use in automotive vehicles, especially certain trucks, where the space available for the suspension parts at the front end of the frame is so restricted as to preclude the installation of the radius rods and transverse thrust elements required in the case of conventional suspension constructions incorporating a member of the limited load-carrying capabilities indicated.

The principal object of the invention is implicit in the foregoing. Other objects and features thereof will be apparent from the following specific description and the accompanying drawings illustrating a preferred embodiment of the invention.

Figure 1:
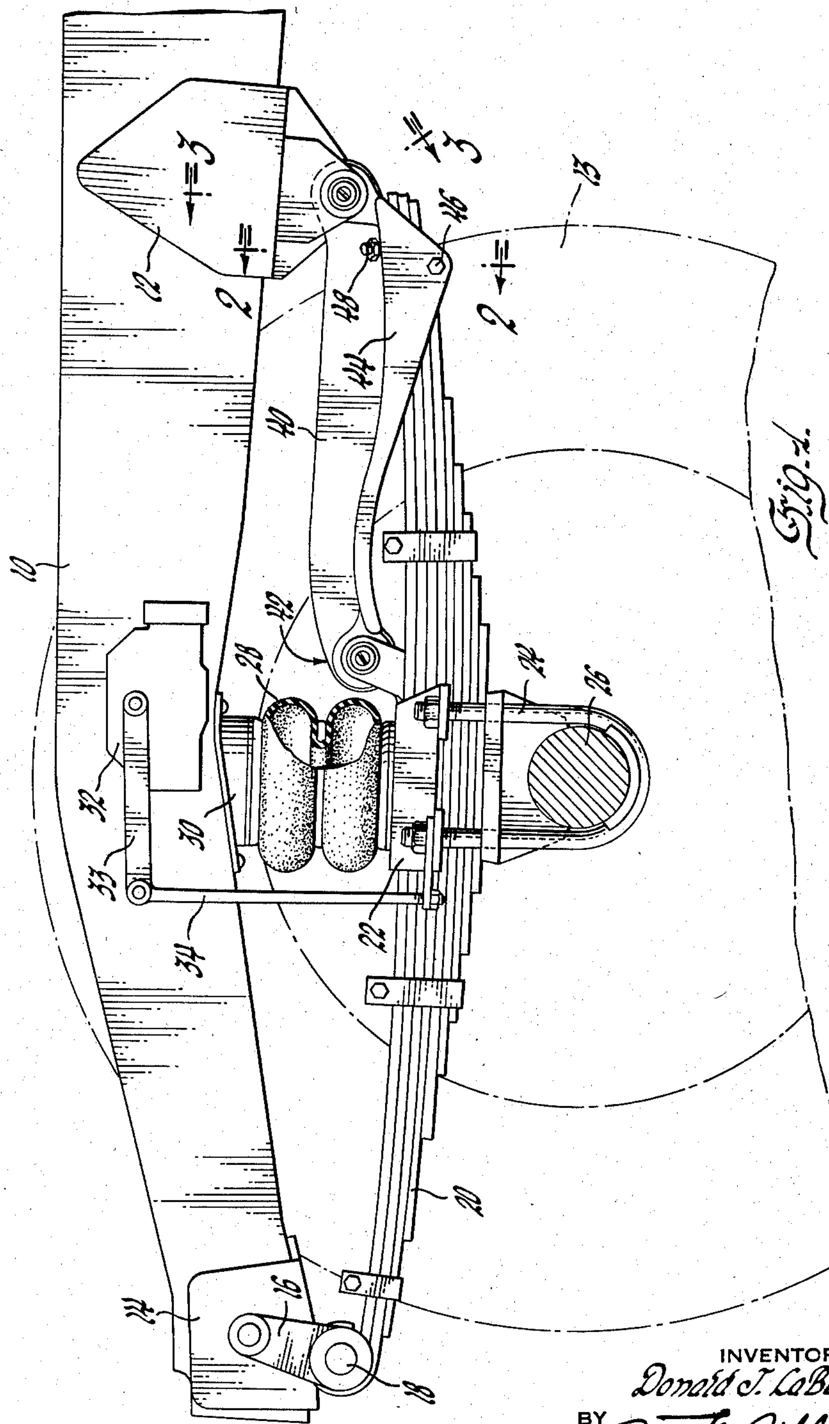
Fig. 1 is a side elevation including a partial section of the elastic member comprised in the particular assembly.

Referring to Fig. 1, the numeral 10 indicates the front end portion of the vehicle frame which carries hanger 12 and a fixture 14 spaced apart a distance approximating the diameter of the wheel 13. From the fixture 14 depends a spring shackle 16 connected through the usual pin 18 to the front end of a leaf spring 20. The latter is relatively quite light in comparison with the leaf spring conventionally employed in a vehicle of the rated capacity contemplated.

A saddle member 22 between the ends of the leaf spring, together with the U-bolts 24, provides a secure connection between the leaf spring and the axle 26. Mounted on and secured to the saddle member is an air bellows 28. Such bellows 28 is fastened to the frame 10 through a header 30. The air supply therefor may be provided by a reservoir carried by the frame or the reservoir may be actually built into the frame. A leveling valve 32, including levers 33 and 34, the latter being

2 connected to the leaf spring 20 via the saddle 22, acts to maintain the level of the frame substantially constant irrespective of load. For description of the construction and operation of this valve, which forms no part of the present invention, see U. S. Patent 2,670,201 to Edwin F. Rossman.

Figure 2:
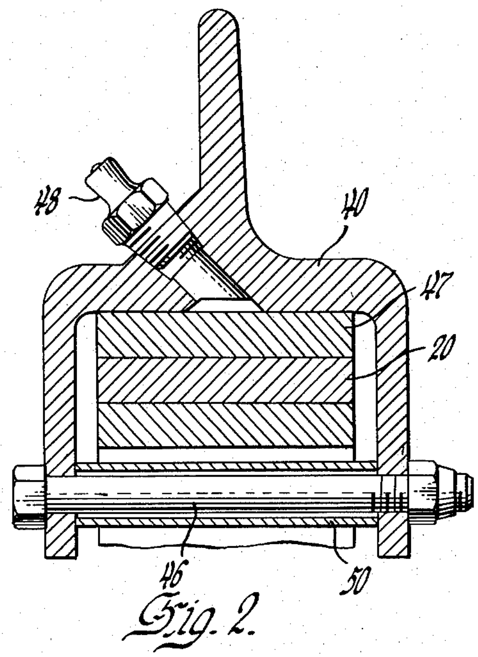
Fig. 2 is a section on the line 2—2 in Fig. 1.
Figure 3:
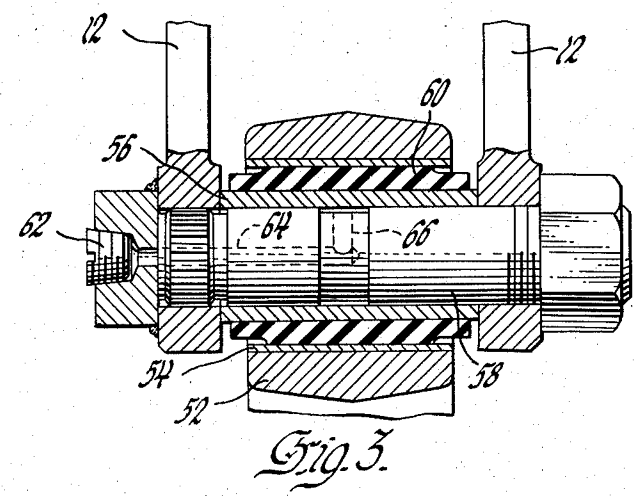
Fig. 3 is a section on the line 3—3 in Fig. 1.

A radius rod 40, pivotally connected to the spring at 42, is bifurcated at 44 to contain a pin 46 over which the leaf spring slides as it flexes under load. The bearing 47 (Fig. 2) between the body of the rod 40 and the leaf spring is with advantage lubricated, fixture 48 being provided for the purpose. As shown in the indicated figure, pin 46 may be supplied with a bearing sleeve 50.

The radius rod 40 terminates at its rear end in an eye 52 which surrounds a shock absorbing and adjusting connector device comprising an outer bearing sleeve 54, an inner sleeve 56 accommodating a shackle bolt 58 and an intermediate sleeve 60 formed of rubber or equivalent resilient material. A fitting 62 allows for lubrication through the passageway 64, 66 formed in the pin.

In operation of the suspension, it should be apparent that the pneumatic spring 28 presents substantially no resistance to torque due to braking action, braking loads being taken by the rod 40 co-acting with the leaf spring. Owing to the contour of the rod, the leaf spring under braking action can assume only a very modified S form; hence undesirable axle wind-up is precluded.

Having thus described and illustrated my novel suspension, what I claim is:

A vehicle suspension comprising, in combination, a leaf spring linked at one end to the frame of the vehicle and connected substantially centrally of its length to an axle member, a radius rod pivotally connected at one end to said spring, the other end of said rod directly engaging a fixed pivotal connection on said frame adjacent the other end of said spring, a third connection on said rod engaging said spring to provide for sliding movement of the latter under load, the surface of said rod involved in said sliding movement having a contour operating to prevent undue distortion of said spring incident to braking action, and pneumatic spring means immediate said frame and said leaf spring disposed in a position substantially centrally of the length of the latter.

References Cited in the file of this patent

UNITED STATES PATENTS

| | | |
|---|---|---|
| 1,620,093 | Fornaca | Mar. 8, 1927 |
| 2,361,575 | Thompson | Oct. 31, 1944 |
| 2,690,334 | Bishop et al. | Sept. 28, 1954 |

FOREIGN PATENTS

| | | |
|---|---|---|
| 370,612 | Great Britain | Apr. 14, 1932 |
| 686,743 | Germany | Jan. 15, 1940 |